United States Patent
Kumar et al.

(10) Patent No.: US 9,829,951 B2
(45) Date of Patent: Nov. 28, 2017

(54) ENHANCED SYSTEM SLEEP STATE SUPPORT IN SERVERS USING NON-VOLATILE RANDOM ACCESS MEMORY

(75) Inventors: Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 13/976,901

(22) PCT Filed: Dec. 13, 2011

(86) PCT No.: PCT/US2011/064686
§ 371 (c)(1),
(2), (4) Date: Jun. 27, 2013

(87) PCT Pub. No.: WO2013/089685
PCT Pub. Date: Jun. 20, 2013

(65) Prior Publication Data
US 2013/0290759 A1   Oct. 31, 2013

(51) Int. Cl.
G06F 1/00 (2006.01)
G06F 1/32 (2006.01)
G06F 9/44 (2006.01)

(52) U.S. Cl.
CPC .......... *G06F 1/3206* (2013.01); *G06F 1/3275* (2013.01); *G06F 1/3287* (2013.01);
(Continued)

(58) Field of Classification Search
CPC ..... G06F 1/3206; G06F 1/3275; G06F 1/3287
See application file for complete search history.

(56) References Cited

U.S. PATENT DOCUMENTS 5,724,544 A * 3/1998 Nishi ........................... 711/115
5,912,839 A   6/1999 Ovshinsky et al.
(Continued)

FOREIGN PATENT DOCUMENTS

CN          101251766 A     8/2008
KR     10-2011-0103258 A    9/2011

OTHER PUBLICATIONS

International Preliminary Report on Patentability for International Application No. PCT/US2011/064686, mailed Jun. 26, 2014, 6 pages.

(Continued)

*Primary Examiner* — Austin Hicks
(74) *Attorney, Agent, or Firm* — Compass IP Law PC

(57) ABSTRACT

A non-volatile random access memory (NVRAM) is used in a computer system to enhance support to sleep states. The computer system includes a processor, a non-volatile random access memory (NVRAM) that is byte-rewritable and byte-erasable, and power management (PM) module. A dynamic random access memory (DRAM) provides a portion of system address space. The PM module intercepts a request initiated by an operating system for entry into a sleep state, copies data from the DRAM to the NVRAM, maps the portion of the system address space from the DRAM to the NVRAM, and turns off the DRAM when transitioning into the sleep state. Upon occurrence of a wake event, the PM module returns control to the operating system such that the computer system resumes working state operations without the operating system knowing that the portion of the system address space has been mapped to the NVRAM.

28 Claims, 4 Drawing Sheets

(52) U.S. Cl.
CPC ........ *G06F 9/4418* (2013.01); *Y02B 60/1225* (2013.01); *Y02B 60/1228* (2013.01); *Y02B 60/1282* (2013.01); *Y02B 60/32* (2013.01)

(56) References Cited

U.S. PATENT DOCUMENTS

| | | | |
|---|---|---|---|
| 6,182,231 | B1 | 1/2001 | Gilgen |
| 6,782,472 | B2 | 8/2004 | Jain et al. |
| 7,380,055 | B2 | 5/2008 | Ashmore |
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |
| 8,051,253 | B2 | 11/2011 | Okin et al. |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,605,531 | B2 | 12/2013 | Kau et al. |
| 8,607,089 | B2 | 12/2013 | Qawami et al. |
| 8,612,676 | B2 | 12/2013 | Dahlen et al. |
| 8,612,809 | B2 | 12/2013 | Casper et al. |
| 8,649,212 | B2 | 2/2014 | Kau et al. |
| 8,838,935 | B2 | 9/2014 | Hinton et al. |
| 8,990,597 | B2 | 3/2015 | Dixon et al. |
| 9,298,606 | B2 | 3/2016 | Ramanujan |
| 9,317,429 | B2 | 4/2016 | Ramanujan et al. |
| 9,342,453 | B2 | 5/2016 | Nale et al. |
| 9,378,133 | B2 | 6/2016 | Nachimuthu et al. |
| 9,430,372 | B2 | 8/2016 | Nachimuthu et al. |
| 2007/0005922 | A1 | 1/2007 | Swaminathan et al. |
| 2007/0223300 | A1 | 9/2007 | Lian et al. |
| 2008/0016269 | A1 | 1/2008 | Chow et al. |
| 2008/0034148 | A1 | 2/2008 | Gower et al. |
| 2008/0082752 | A1* | 4/2008 | Chary et al. ................ 711/118 |
| 2008/0164704 | A1 | 7/2008 | Baskett et al. |
| 2008/0270811 | A1 | 10/2008 | Chow et al. |
| 2009/0172439 | A1* | 7/2009 | Cooper et al. ................ 713/323 |
| 2009/0313416 | A1 | 12/2009 | Nation |
| 2010/0131827 | A1 | 5/2010 | Sokolov et al. |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0153916 | A1 | 6/2011 | Chinnaswamy et al. |
| 2011/0154065 | A1 | 6/2011 | Rothman et al. |
| 2011/0208900 | A1 | 8/2011 | Schuette et al. |
| 2011/0291884 | A1 | 12/2011 | Oh et al. |
| 2013/0275661 | A1 | 10/2013 | Zimmer et al. |
| 2013/0290597 | A1 | 10/2013 | Faber |
| 2014/0129767 | A1 | 5/2014 | Ramanujan et al. |
| 2014/0297938 | A1 | 10/2014 | Puthiyedath et al. |

OTHER PUBLICATIONS

Office Action including Search Report in related Taiwan Application No. 101142624, dated Jul. 22, 2015, with English Translation.
Lee et al., "Architecting Phase Change Memory as a Scalable DRAM Alternative", ISCA '09, Jun. 20, 2009, 12 pgs., Austin, Texas, USA.
Condit et al., "Better I/O Through Byte-Addressable, Persistent Memory", SOSP '09, Oct. 11, 2009, pp. 133-146. Big Sky, Montana, USA.
Freitas et al, "Storage-class memory: The next storage system technology", IBM J. RES. & DEV., Jul./Sep. 2008, pp. 439-447, vol. 52, No. 4/5.
Akel et al., "Onyx: A Prototype Phase Change Memory Storage Array",www.flashmemorysummit.com/.../Proceeding_2011/08/11_S301_Akel.pdf, 5 pgs.
Mearian, "IBM announces computer memory breakthrough Phase-change memory offers 100 times the write performance of NAND flash", Jun. 30, 2011, 3 pgs.
Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.
"The Non-Volatile Systems Laboratory Coding for non-volatile memories", http://nvsl.ucsd.edu/ecc, printed Sep. 1, 2011. 2 pgs.
"The Non-Volatile Systems Laboratory Moneta and Onyx: Very Fast SS", http://nvsl.ucsd.edu/moneta/, 3 pgs., Sep. 1, 2011.
"The Non-Volatile Systems Laboratory NV-Heaps: Fast and Safe Persistent Objects", http://nvsl.ucsd.edu/nvuheaps/, 2 pgs., Sep. 1, 2011.
"Phase change memory-based 'moneta' system points to the future of computer storage", ScienceBlog, Jun. 2, 2011, 7 pgs.
Quereshi et al., "Scalable High Performance Main Memory System Using Phase-Change Memory Technology", ISCA '09, Jun. 20, 2009, 10 pgs., Austin, Texas, USA.
Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.
Bailey et al., "Operating System Implications of Fast, Cheap, Non-Volatile Memory" 13th USENIX, HOTOS11 2011, May 9-11, 2011, 5 pgs.
Raoux et al., "Phase-change random access memory: A scalable technology", IBM J. Res. & Dev., Jul./Sep. 2008, pp. 465-479, vol. 52, No. 4/5.
Chen et al., "Rethinking Database Algorithms for Phase Change Memory", 5th Biennial Conference on Innovative Data Systems Research (CIDR '11), Jan. 9, 2011, 11 pgs., Asilomar, California, USA.
Jacob et al., "The Memory System You Can't Avoid It, You Can't Ignore It, You Can't Fake It", 2009, 77 pgs., Morgan & Claypool.
Mogul et al., "Operating System Support for NVM+DRAM Hybrid Main Memory", 12th Workshop on Hot Topics in Operating Systems (HATOS XII), May 18, 2009, 9 pgs.
Nu, et al., "eNVy: A Non-Volatile, Main Memory Storage System" 1994 ACM., ASPLOS VI. pp. 86-97.
Dhiman, et al. "PDRAM: A Hybrid PRAM and DRAM Main Memory System", Jul. 26, 2009, Department of Computer Science and Engineering, 6 pages.
PCT International Search Report dated Jul. 31, 2012 for PCT Application No. PCT/US2011/064686, filed Dec. 13, 2011, 3 pages.
PCT Written Opinion of the International Searching Authority dated Jul. 31, for PCT Application No. PCT/US2011/064686, filed Dec. 13, 2011, 4 pages.

\* cited by examiner

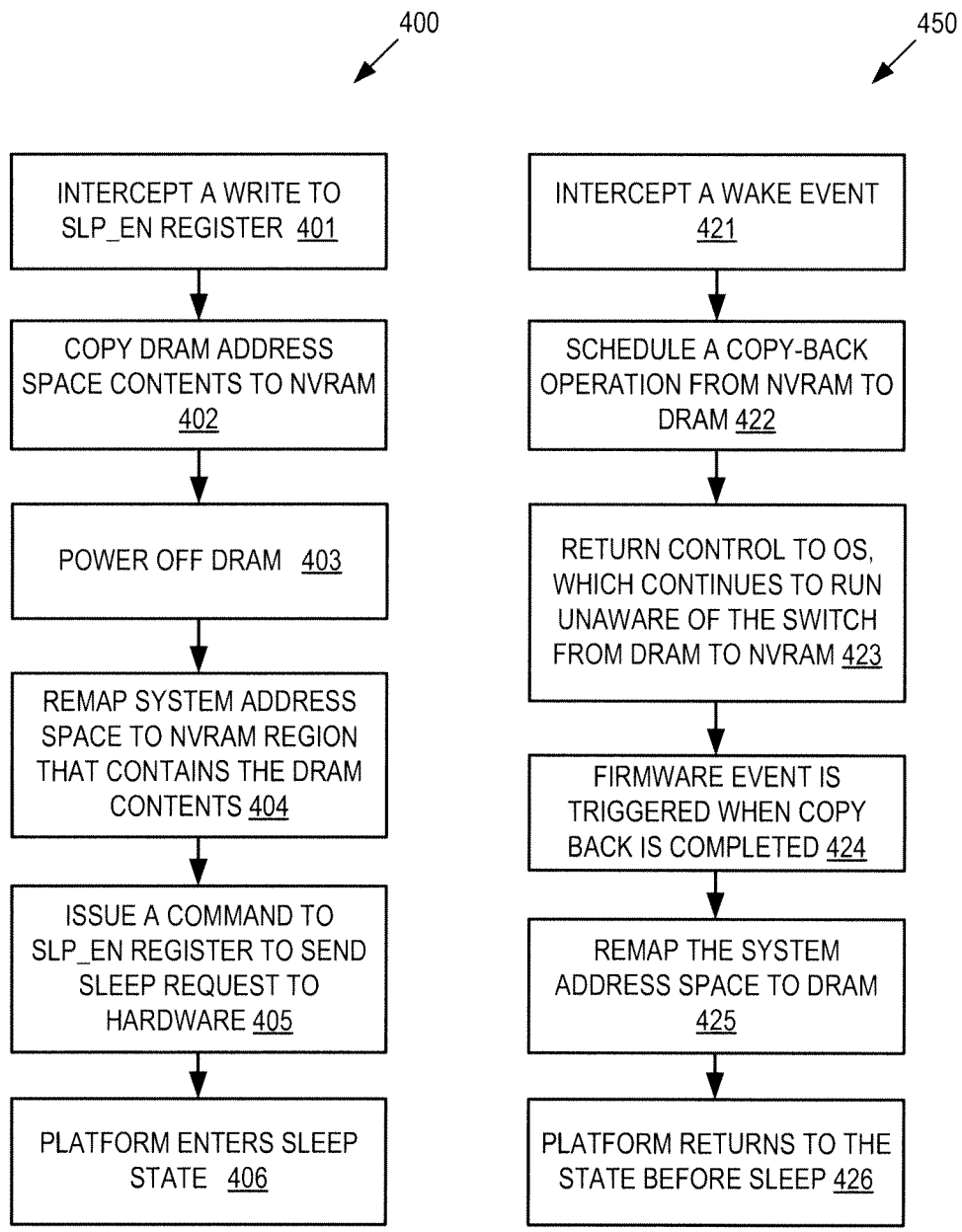

ENHANCED SYSTEM SLEEP STATE SUPPORT IN SERVERS USING NON-VOLATILE RANDOM ACCESS MEMORY

CROSS-REFERENCE TO RELATED APPLICATION

This patent application is a U.S. National Phase Application under 35 U.S.C. §371 of International Application No. PCT/US2011/064686, filed Dec. 13, 2011, entitled ENHANCED SYSTEM SLEEP STATE SUPPORT IN SERVERS USING NON-VOLATILE RANDOM ACCESS MEMORY.

BACKGROUND

Field of the Invention

Embodiments of the invention relate to a computer system; and more specifically, to the enhancement to the sleep state support of a computer system using a non-volatile random access memory.

Description of the Related Art

A. Current Memory and Storage Configurations

One of the limiting factors for computer innovation today is memory and storage technology. In conventional computer systems, main memory is typically implemented by dynamic random access memory (DRAM). DRAM-based memory consumes power even when no memory reads or writes occur because it must constantly recharge internal capacitors. DRAM-based memory is volatile, which means data stored in DRAM memory is lost once the power is removed.

A recent study shows that power used by server computers per year is increasing at an alarming rate. In 2005, the power consumption by server computers was more than 1.2 billion kilowatt-hours, representing 1% of worldwide electricity usage. The cost of electricity has increased 41% in a seven-year period from 2000-2007, according to the statistics provided by the U.S. Department of Energy. These statistics highlight the need for power-efficient server computers.

Conventionally, server operating system (OS) and virtual machine monitor (VMM) typically support only a subset of system sleep states due to various limitations, such as latency requirements, preservation of system state in case of a crash, etc. Typically, the supported system sleep states include S1 (standby state) and S5 (soft off state), as defined by the Advanced Configuration and Power Interface (ACPI) specification rev. 4.0a. In large memory configurations, the support for S4 (hibernate state) can be limited due to the high latency of entering that state. Support for other sleep states is either not present or varies based on the OS, VMM and platform configurations. This results in lost opportunities for power savings on server platforms.

B. Phase-Change Memory (PCM) and Related Technologies

Phase-change memory (PCM), also sometimes referred to as PCME, PRAM, PCRAM, Ovonic Unified Memory, Chalcogenide RAM and C-RAM, is a type of non-volatile computer memory which exploits the unique behavior of chalcogenide glass. As a result of heat produced by the passage of an electric current, this material can be switched between two states: crystalline and amorphous. Recent versions of PCM can achieve two additional distinct states, effectively doubling memory storage capacity.

For example, PCM can offer much higher performance in applications where writing quickly is important, in part because the memory element can be switched more quickly, and also because individual bits may be changed to either 1 or 0 without the need to first erase an entire block of cells (as is the case with flash memory ("flash")). The high performance of PCM makes it potentially very beneficial in non-volatile memory roles that are currently performance-limited by memory access timing.

Additionally, while PCM devices degrade with use, they degrade much more slowly compared to flash memory. A PCM device may survive approximately 100 million write cycles. PCM lifetime is limited by mechanisms such as degradation due to GeSbTe (GST) thermal expansion during programming, metal (and other material) migration, and other mechanisms.

BRIEF DESCRIPTION OF THE DRAWINGS

The invention may best be understood by referring to the following description and accompanying drawings that are used to illustrate embodiments of the invention. In the drawings:

FIG. 4A illustrates a method of a computer system entering a sleep state according to one embodiment of the invention.

FIG. 4B illustrates a method of a computer system exiting a sleep state according to one embodiment of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

Embodiments of the invention described below enhance system sleep states for computer systems, in particular, server computers. The enhanced system sleep states provide significant power savings. The existing operating systems on these server computers can remain unchanged with respect to their support for the system sleep states. In one embodiment, the enhancement is enabled by the use of non-volatile random-access memory (NVRAM); e.g., Phase Change Memory (PCM) based memory technology.

In one embodiment, the computer system described herein includes both NVRAM and dynamic random access memory (DRAM) as the system memory. Since NVRAM is non-volatile, the data in the NVRAM is retained even when its power supply is turned off. Data stored in the DRAM can be copied into the NVRAM before the computer system transitions into a sleep state, allowing the power supply to the DRAM to be turned off when the system enters the sleep state. As a result, a significant amount of power can be saved.

Figure 1:
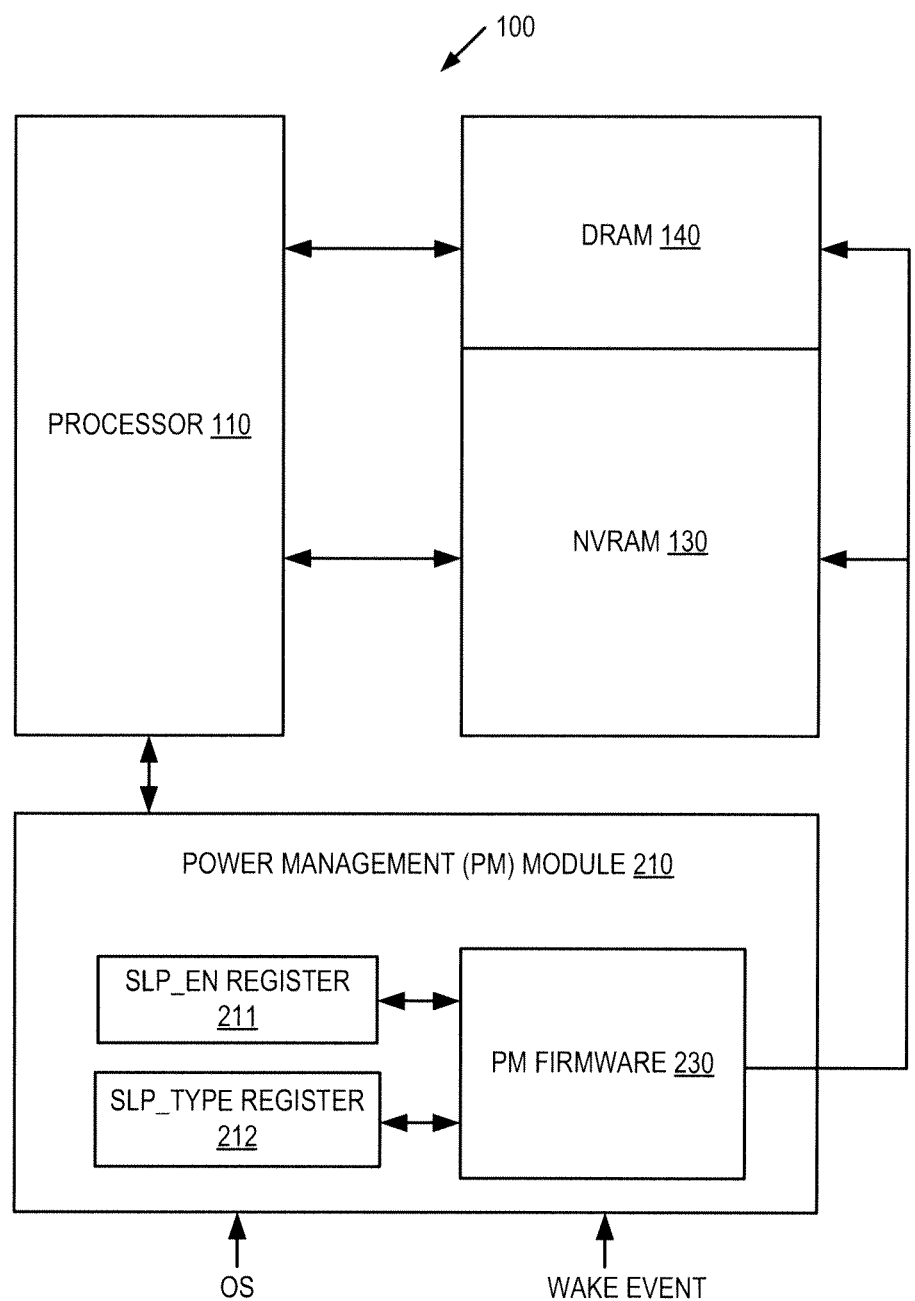
FIG. 1 illustrates a computer system that provides enhanced sleep state support according to one embodiment of the invention.

FIG. 1 is a block diagram illustrating a computer system 100 that provides enhanced sleep state support according to one embodiment of the invention. In one embodiment, computer system 100 includes processor 110 coupled to DRAM 140 and NVRAM 130. Additionally, computer system 100 includes a power management (PM) module 210 to manage the sleep state transitions for the computer system 100. In one embodiment, PM module 210 includes PM firmware 230 and a number of registers, such as an SLP_EN register 211 and an SLP_TYP register 212. Additional components, such as logical and/or memory circuitry, may also be included. SLP_EN register 211 and SLP_TYP register 212 are used by the operating system (OS) to indicate sleep enable and the type of sleep state, respectively. In one embodiment, the type of sleep state is defined according to the Advanced Configuration and Power Interface (ACPI) specification rev. 4.0a.

In one embodiment, PM firmware 230 stores PM code executable by processor 110 to perform sleep state transitions. In an alternative embodiment, PM firmware 230 stores PM code executable by logic circuitry (e.g., a micro-controller, gates, or other circuitry) (not shown) located within processor 110, in a chipset coupled to processor 110, or elsewhere in computer system 100. Upon detection of a sleep request (e.g., when SLP_EN register 211 is set by the OS), PM firmware 230 copies the contents of DRAM 140 to NVRAM 130, and causes the power supply to DRAM 140 to be turned off. Upon detection of a wake event (e.g., when SLP_EN register 211 is set by the OS), PM firmware 230 copies back the contents in NVRAM 130 to DRAM 140. As NVRAM 130 is able to retain the stored contents across power cycles, power supplied to DRAM 140 can be safely removed in the sleep state without loss of data.

It is understood that PM module 210 as shown in FIG. 1 is a logical representation of the circuitry for managing the sleep state transitions. In the embodiment of FIG. 1, PM module 210 is located in a chipset coupled to processor 110. In an alternative embodiment, PM module 210 can be located on more than one hardware component. For example, a first part of PM module 210 (e.g., SLP_EN register 211 and an SLP_TYP register 212) can be located within processor 110 or an I/O subsystem chipset coupled to the processor 110, and a second part of PM module 210 (e.g., PM firmware 230) can be located within a non-volatile memory device; e.g., NVRAM 130. It is also understood that, in some alternative embodiments, the functionality of PM firmware 230 can be implemented by hardware, software, firmware, or a combination thereof. The hardware, software and firmware may be located on the same hardware component, or in different hardware components. These alternative embodiments will be described in detail with reference to FIG. 2.

One advantage of embodiments of the invention is that it does not incur any change to the OS. Instead, PM firmware 230 intercepts the normal flow of sleep state transitions and performs power-saving operations. This power saving also extends to a virtual machine system, in which a computer system hosts multiple virtual machines. Each of the virtual machines can enter a sleep state independent of other virtual machines. PM firmware 230 can intercept the normal flow of sleep state transitions for each virtual machine, without incurring any change to the virtual machine monitor (VMM) in the system. In the following description, the term "OS" is used to describe the system software that is responsible for system resource allocation. It is understood that in a virtual machine system, the term "OS" in the following description can be replaced by "VMM."

Figure 2:
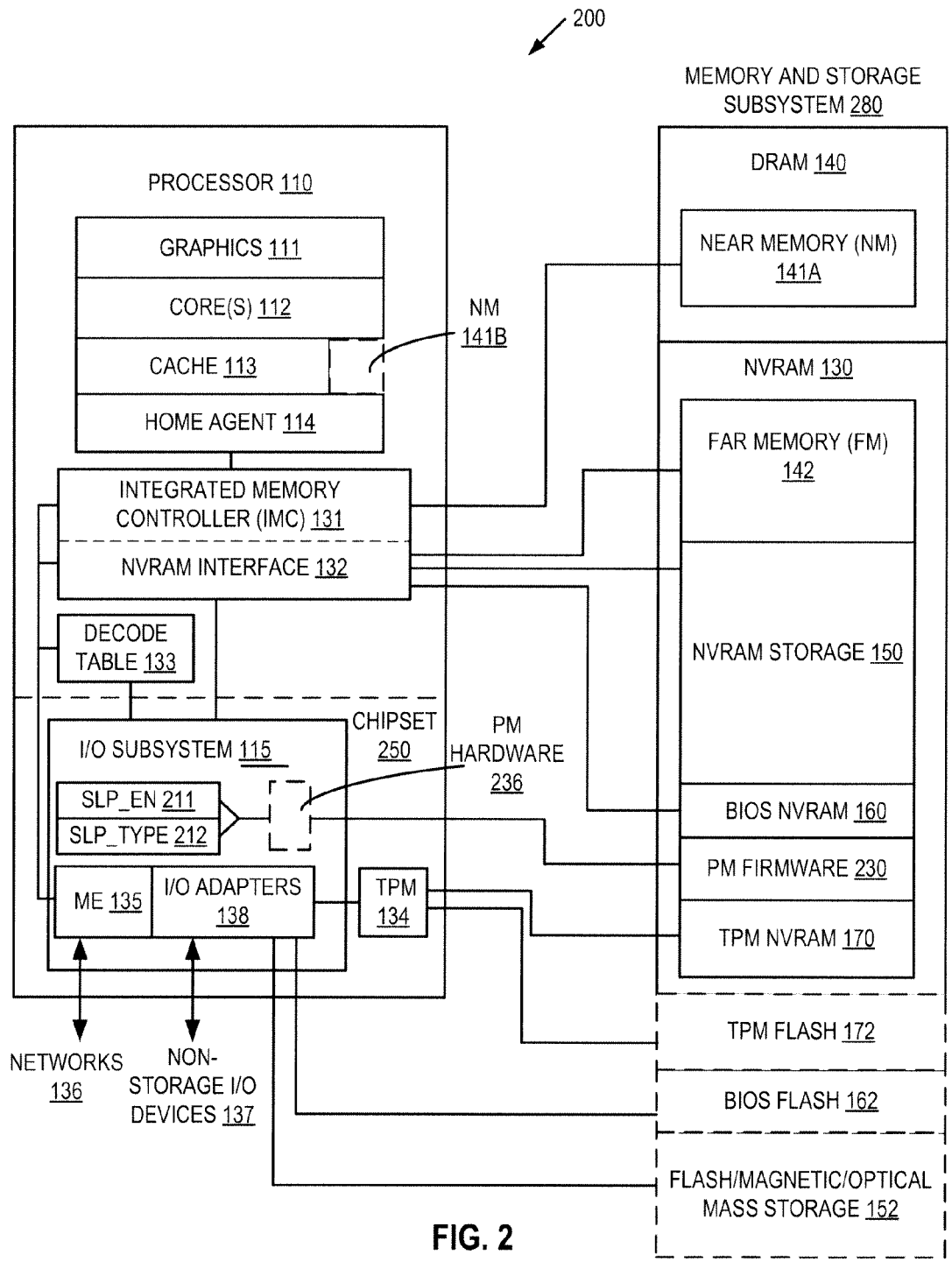
FIG. 2 illustrates a computer system that uses non-volatile memory random access (NVRAM) in one or more tiers of the platform storage hierarchy according to one embodiment of the invention.

FIG. 2 is a block diagram illustrating a computer system 200 that uses byte-addressable NVRAM 130 in one or more tiers of the platform storage hierarchy. The term "platform storage hierarchy" herein refers to the entire storage media used by computer system 200 for storing data, instructions, states, and other persistent and non-persistent information. In one embodiment, all persistent storage in the computer system 200 can coalesce into one NVRAM 130 in a configurable fashion. In addition, some portion of NVRAM 130 can be apportioned as DRAM replacement for system memory. The versatility of NVRAM 130 facilitates technology migration from a conventional platform having an OS that operates on a persistent block-oriented file system, to an OS that understand a fully-persistent, byte-addressable, single-level data store.

In one embodiment, NVRAM 130 can be configured to implement the roles in a typical platform storage hierarchy as one or more of the following: cache, system memory (also known as main memory, primary memory, executable memory), storage (also known as secondary storage and mass storage), and firmware memory (such as boot memory (also known as BIOS flash), Trusted Platform Module (TPM) memory, and the like). Platform storage hierarchies with different roles are also contemplated and the application of NVRAM 130 is not limited to the roles described above.

NVRAM 130 is distinguishable from other instruction and data memory/storage technologies in terms of its characteristics and/or its application in the platform storage hierarchy. For example, NVRAM 130 is different from:

1) static random access memory (SRAM) applied as a cache dedicated to a processor core or shared by multiple processor cores;
2) higher speed memory (e.g., dynamic random access memory (DRAM)) applied as one or more caches internal to the processor (e.g., on the same die as the processor) and/or external to processor (e.g., on the same or a different package from the processor);

3) flash memory/magnetic disk/optical disc applied as drive storage; and memory such as flash memory or read only memory (ROM) applied as boot ROM.

NVRAM (e.g., NVRAM 130) in one embodiment of the invention has the following characteristics:

1) non-volatile (it maintains its content even if power is removed, similar to flash memory used in solid state disks (SSD), and different from SRAM and DRAM which are volatile);
2) lower power consumption than volatile memories such as SRAM and DRAM;
3) random access (also known as randomly addressable);
4) rewritable and erasable at a lower level of granularity (e.g., byte level) than flash found in SSDs (which can only be rewritten and erased a "block" at a time— minimally 64 Kbyte in size for NOR flash and 16 Kbyte for NAND flash);
5) usable as a system memory and allocated all or a portion of the system address space;
(6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte); and
7) one or more of the following:
  a) faster write speed than current non-volatile memory/storage technologies (such as flash);
  b) very high read speeds (faster than flash and near or equivalent to DRAM read speeds);
  c) directly writable (rather than requiring erasing (overwriting with 1 s) before writing data like flash memory used in SSDs); and/or
  d) orders of magnitude (e.g., 2 or 3) higher write endurance before failure (more than boot ROM and flash used in SSDs).

As mentioned above, in contrast to flash memory, which must be rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM 130 is used as system memory, NVRAM may be accessed at the granularity of a cache line (e.g., a 64-byte or 128-byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by flash and the access size of the I/O subsystem's controller and bus.

NVRAM 130 may be used as instruction and data storage that has sufficiently short access time requirements to cause little impact on the processors. Here, program instructions and data may be loaded into NVRAM 130 from deeper, flash/magnetic/optical mass storage 152 prior to being executed by the processors. Moreover, as described in detail below, NVRAM 130 may be placed on a memory bus and may communicate directly with a memory controller that, in turn, communicates directly with the processors.

The presence of the new memory technology for NVRAM 130 provides for a wealth of new possibilities. Although discussed at much greater length further below, some of these possibilities are quickly highlighted immediately below.

According to one possible implementation, NVRAM 130 acts as a total replacement or supplement for traditional DRAM technology in system memory. In one embodiment, NVRAM 130 represents the introduction of a second-level system memory (e.g., system memory is as a combination of DRAM 140 and some or all of NVRAM 130). As such, the system memory may be viewed as having a near memory part NM 141A and a far memory part FM 142. It is appreciated that in different embodiments, a near memory can serve as a memory-side cache, a scratch pad, and other roles that are different from the system memory.

According to some embodiments, NVRAM 130 provides NVRAM storage, which acts as a total replacement or supplement for traditional mass storage, e.g., flash/magnetic/optical mass storage 152. The term "traditional mass storage" in the application refers to mass storage that is based on optical, magnetic and/or flash technology, such as disk and flash memory. For simplicity of the discussion, flash/magnetic/optical mass storage 152 is also referred to as traditional mass storage 152. Thus, the non-volatile mass storage for computing system 200 may be implemented using NVRAM, flash memory, magnetic storage, or any combination thereof. In an embodiment where NVRAM storage 150 acts as a total replacement for traditional mass storage 152, it is not necessary to use storage drivers for block-addressable storage access. The removal of storage driver overhead from storage access can increase access speed and save power. In alternative embodiments where it is desired that NVRAM storage 150 appears to the OS and/or applications as block-accessible and indistinguishable from traditional mass storage 152, emulated storage drivers can be used to expose block-accessible interfaces (e.g., Universal Serial Bus (USB) Bulk-Only Transfer (BOT) 1.0, Serial Advanced Technology Attachment (SATA) 3.0, and the like) to the software for accessing NVRAM storage 150. That is, the byte addressability of NVRAM 130 can be used by the storage driver to move blocks of NVRAM storage 150 and emulate block accessible mass storage without incurring the cost of I/O interfaces in these alternative embodiments.

According to some embodiments, NVRAM 130 provides firmware memory. In the embodiment of FIG. 2, only BIOS NVRAM 160 and TPM NVRAM 170 are shown. It is understood that other firmware partitions can also be included. These firmware partitions act as a total replacement or supplement for firmware memory such as BIOS flash 162 and TPM flash 172. Firmware memory is commonly implemented with flash technology and commonly stores the initial instructions (e.g., BIOS) executed by a processor to initialize key system components during a boot process. Firmware memory can also store system persistent states used by a TPM 134 to protect sensitive system information (e.g., encryption keys). In one embodiment, the use of NVRAM 130 for firmware memory removes the need for third party flash parts to store code and data that are critical to the system operations.

It should be understood that NVRAM 130 can include more or fewer partitions than what is shown in FIG. 2. For example, NVRAM 130 can include a partition serving as persistent memory. The persistent memory is a type of memory which is byte-addressable directly by processor and I/O for reads and writes; however, unlike volatile memory, writes to the memory are retained across platform power cycles. In some embodiments wherein flash devices or other non-volatile devices are used for storing the BIOS and/or TPM, it may be unnecessary to include BIOS flash 162 and/or TPM flash 172 as part of NVRAM 130.

The choice of memory and storage devices may depend on the type of platform on which the devices are used. For example, in a personal computer, tablet computer, notebook computer, mobile device (e.g., smartphone or PDA), the non-volatile mass storage may be implemented using NVRAM storage 150 alone, or using NVRAM storage 150 in combination with flash/magnetic storage. In other implementations (e.g., large-scale servers), the non-volatile mass storage may be implemented using magnetic storage (e.g., hard drives) or any combination of magnetic storage, flash, and NVRAM storage 150. In such a case, computer system hardware and/or software responsible for storage may implement various intelligent persistent storage allocation techniques to allocate blocks of persistent program code and data between the FM 142/NVRAM storage 150 and traditional mass storage 152 in an efficient or otherwise useful manner. In some embodiments, NVRAM 130 may become the sole memory/storage device off chip (i.e., off the processor chip). In some embodiments, instead of or in addition to the off-chip DRAM 140, DRAM 140 may be used to provide an on-chip memory (e.g., near memory 141B). These embodiments can be specifically relevant to very small platforms (e.g., smartphone or PDA), where multiple memory classes/technologies may be cost prohibitive and more transistors (including storage) can be placed on chip.

The NVRAM 130 may incorporate "wear leveling" algorithms to account for the fact that the storage cells at the far memory level begin to wear out after too many write accesses. Since high cycle count blocks are most likely to wear out in this manner, wear leveling spreads writes across the far memory cells by swapping addresses of high cycle count blocks with low cycle count blocks. Note that most address swapping is typically transparent to the end user because it is handled by hardware, software (e.g., a low level driver or operating system), or a combination of the.

In one embodiment, NVRAM 130 can be implemented with a non-volatile random access memory such as PCM or, more specifically, PCMS (also known as (PRAM or PCRAM), Ovonic Unified Memory (OUM), (CRAM). Other possible technology choices for far memory include, but are not limited to byte-addressable persistent memory (BPRAM), storage class memory (SCM), universal memory, Ge2Sb2Te5, Programmable metallization cell (PMC), Resistive memory (RRAM), RESET (amorphous) cell, SET (crystalline) cell, PCME, Ovshinsky, ferroelectric memory (also known as polymer memory and poly(N-vinylcarbazole)), ferromagnetic memory (also known as Spintronics, SPRAM (spin-transfer torque RAM), STRAM (spin tunneling RAM), Magnetoresistive, Magnetic memory, and Magnetic random access memory (MRAM)), and Semiconductor-oxide-nitride-oxide-semiconductor (SONOS, also know dielectric memory).

For convenience of explanation, most of the remainder of the application will sometimes refer to "PCM" or "PCMS" as the technology selection for NVRAM 130. As such, the terms NVRAM, PCM and PCMS may be used interchangeably in the following discussion. However it should be realized, as discussed above, that different technologies may also be utilized for NVRAM 130.

Continuing then with a discussion of the system of FIG. 2, in some embodiments, the architecture of computer system 200 may include multiple processors, although a single processor 110 is illustrated in FIG. 2 for simplicity. Processor 110 may be any type of data processor including a general purpose or special purpose central processing unit (CPU), an application-specific integrated circuit (ASIC) or a digital signal processor (DSP). For example, processor 110 may be a general-purpose processor, such as a Core™ i3, i5, i7, 2 Duo and Quad, Xeon™, or Itanium™ processor, all of which are available from Intel Corporation, of Santa Clara, Calif. Alternatively, processor 110 may be from another company, such as ARM Holdings, Ltd, of Sunnyvale, Calif., MIPS Technologies of Sunnyvale, Calif., etc. Processor 110 may be a special-purpose processor, such as, for example, a network or communication processor, compression engine, graphics processor, co-processor, embedded processor, or the like. Processor 110 may be implemented on one or more chips included within one or more packages. Processor 110 may be a part of and/or may be implemented on one or more substrates using any of a number of process technologies, such as, for example, BiCMOS, CMOS, or NMOS.

In one embodiment, the processor 110 includes an integrated graphics unit 111 which includes logic for executing graphics commands such as 3D or 2D graphics commands. While the embodiments of the invention are not limited to any particular integrated graphics unit 111, in one embodiment, the graphics unit 111 is capable of executing industry standard graphics commands such as those specified by the Open GL and/or Direct X application programming interfaces (APIs) (e.g., OpenGL 4.1 and Direct X 11).

The processor 110 may also include one or more cores 112, although a single core 112 is illustrated in FIG. 2, again, for the sake of clarity. In many embodiments, core 112 includes internal functional blocks such as one or more execution units, retirement units, a set of general purpose and specific registers, etc. If core 112 is multi-threaded or hyper-threaded, then each hardware thread may be considered as a "logical" core as well. The cores 112 may be homogenous or heterogeneous in terms of architecture and/or instruction set. For example, some of the cores may be in order while others are out-of-order. As another example, two or more of the cores may be capable of executing the same instruction set, while others may be capable of executing only a subset of that instruction set or a different instruction set.

The processor 110 may also include one or more caches, such as cache 113 which may be implemented as a SRAM and/or a DRAM. In many embodiments that are not shown, additional caches other than cache 113 are implemented so that multiple levels of cache exist between the execution units in the core(s) 112 and memory devices 141A and 142. For example, the set of shared cache units may include an upper-level cache, such as a level 1 (L1) cache, mid-level caches, such as level 2 (L2), level 3 (L3), level 4 (L4), or other levels of cache, a last level cache (LLC), and/or different combinations thereof. In different embodiments, cache 113 may be apportioned in different ways and may be one of many different sizes in different embodiments. For example, cache 113 may be an 8 megabyte (MB) cache, a 16

MB cache, etc. Additionally, in different embodiments the cache may be a direct mapped cache, a fully associative cache, a multi-way set-associative cache, or a cache with another type of mapping. In other embodiments that include multiple cores, cache 113 may include one large portion shared among all cores or may be divided into several separately functional slices (e.g., one slice for each core). Cache 113 may also include one portion shared among all cores and several other portions that are separate functional slices per core. In one embodiment, cache 113 may include a DRAM NM 141B acting as cache.

The processor 110 may also include a home agent 114 which includes those components coordinating and operating core(s) 112. The home agent unit 114 may include, for example, a power control unit (PCU) and a display unit. The PCU may be or include logic and components needed for regulating the power state of the core(s) 112 and the integrated graphics unit 111. The display unit is for driving one or more externally connected displays.

In some embodiments, processor 110 includes an integrated memory controller (IMC) 131 to provide an interface for communicating with a memory and storage subsystem 280. More specifically, in one embodiment, IMC 131 contains logic necessary for reading from, writing to and refreshing DRAM device 140. IMC 131 can be on the same chip as processor 110, or on a separate chip and/or package connected to processor 110.

In some embodiments, processor 110 is coupled to an I/O subsystem 115. I/O subsystem 115 enables communication between processor 110 and the following serial or parallel I/O devices: one or more networks 136 (such as a Local Area Network, Wide Area Network or the Internet), storage I/O device (such as flash/magnetic/optical mass storage 152, BIOS flash 162, TPM flash 172) and one or more non-storage I/O devices 137 (such as display, keyboard, speaker, and the like). I/O subsystem 115 may include a platform controller hub (PCH) (not shown) that further includes several I/O adapters 138 and other I/O circuitry to provide access to the storage and non-storage I/O devices and networks. To accomplish this, I/O subsystem 115 may have at least one integrated I/O adapter 138 for each I/O protocol utilized. I/O subsystem 115 can be on the same chip as processor 110, or on a separate chip/package connected to processor 110 (as shown by the dotted line indicating a separate chip/package 250).

I/O adapters 138 translate a host communication protocol utilized within the processor 110 to a protocol compatible with particular I/O devices. For traditional mass storage 152, some of the protocols that I/O adapters 138 may translate include Peripheral Component Interconnect (PCI)-Express 3.0, Universal Serial Bus (USB) 3.0, Serial Advanced Technology Attachment (SATA) 3.0, Small Computer System Interface (SCSI), Redundant Array of Inexpensive Disks (RAID) and 1394 "Firewire," among others. For BIOS flash 162, some of the protocols that I/O adapters 138 may translate include Serial Peripheral Interface (SPI), Microwire, among others. Additionally, there may be one or more wireless protocol I/O adapters. Examples of wireless protocols are Bluetooth 4.0, IEEE 802.11-based wireless protocols, and cellular protocols, among others.

In some embodiments, I/O subsystem 115 also includes a Management Engine (ME) 135, which is a microprocessor (equivalently, a micro-controller) that allows a system administrator to monitor, maintain, update, upgrade, and repair computer system 200. In one embodiment, a system administrator can remotely configure computer system 200 through ME 135 via networks 136. In one embodiment, the configuration can be stored in a decode table 133 within processor 110. Decode table 133 can be read by IMC 131 and I/O subsystem 115, which then decide where a data access request should be directed.

In some embodiments, chipset 250 includes a Trusted Platform Module (TPM) 134 to control access to system persistent states, such as secure data, encryption keys, platform configuration information and the like. In one embodiment, these system persistent states are stored in a TPM NVRAM 170, which can be implemented with PCM-based memory such as PCMS. In the embodiment shown in FIG. 2, TPM NVRAM 170 is part of NVRAM 130.

In one embodiment, TPM 134 is a secure micro-controller with cryptographic functionalities. TPM 134 has a number of trust-related capabilities; e.g., a "seal" capability for ensuring that data protected by a TPM is only available for the same TPM. TPM 134 can protect data and keys (e.g., secrets) using its encryption capabilities. In one embodiment, TPM 134 has a unique and secret RSA key (which is generated based on the RSA algorithm developed by Ron Rivest, Adi Shamir and Leonard Adleman), which allows it to authenticate hardware devices and platforms. For example, TPM 134 can verify that a system seeking access to data stored in computer system 200 is the expected system. TPM 134 is also capable of reporting the integrity of the platform (e.g., computer system 200). This allows an external resource (e.g., a server on a network) to determine the trustworthiness of the platform but does not prevent access to the platform by the user. In one embodiment, TPM 134 includes an NVRAM interface to communicate with NVRAM 130.

In one embodiment, ME 135 and TPM 134 can be located on one or more chipsets (e.g., chipset 250) outside of and coupled to processor 110. These chipset configurations can be suitable for server platforms. In alternative embodiments, ME 135 and TPM 134 can be located within processor 110 in a system-on-a-chip (SOC) configuration. The SOC configuration is suitable for mobile platforms and other portable systems.

It should be understood that a computer system can utilize NVRAM 130 for system memory, mass storage, firmware memory and/or other memory and storage purposes even though its processor does not have all of the above-described components of processor 110, or has more components than processor 110.

In one embodiment, computer system 200 includes a NVRAM interface 132 to control data access to NVRAM 130. NVRAM interface 132 is coupled to IMC 131 and I/O subsystem 115. NVRAM interface 132 can read the configuration data from decode table 133, or alternatively, can rely on the decoding results passed from IMC 131 and I/O subsystem 115. In an embodiment where NVRAM 130 is implemented with PCMS, NVRAM interface 132 is a PCMS interface that performs byte-level access with protocols consistent with the PCMS technology. Although IMC 131 and NVRAM controller 132 can be two discrete controllers (as shown in FIG. 2 with a dotted line separating the two controllers), in some embodiments these two controllers can be implemented as one combined controller to control the access to memory and storage. In alternative embodiments, NVRAM controller 132 can be located within NVRAM 130 to control the access to the NVRAM memory cells. In these alternative embodiments, an NVRAM interface (not shown) can be provided on the processor chip to interface with NVRAM 130.

In FIG. 2, NVRAM controller 132 is shown connected to FM 142, NVRAM mass storage 150 and BIOS NVRAM 160 using three separate lines. This does not necessarily mean, however, that there are three separate physical buses or communication channels connecting NVRAM controller 132 to these portions of the NVRAM 130. Rather, in some embodiments, a common memory bus or other type of bus is used to communicatively couple the NVRAM controller 132 to the FM 142, NVRAM mass storage 150, and BIOS NVRAM 160. For example, in one embodiment, the three lines in FIG. 2 represent a bus, such as a memory bus (e.g., a DDR3, DDR4, etc.) over which NVRAM controller 132 implements a transactional protocol to communicate with NVRAM 130. NVRAM controller 132 may also communicate with NVRAM 130 over a bus supporting a native transactional protocol such as a PCI express (PCI-E) bus, desktop management interface (DMI) bus, or any other type of bus utilizing a transactional protocol.

In some embodiment, NVRAM 130 can be coupled to processor 110 via a high-speed link that follows the same protocol as the inter-processor protocol (e.g., HyperTransport 3.0, Quick-Path Interconnect (QPI) 1.1 and its variants, and the like). In these embodiments, NVRAM controller 132 can communicate with NVRAM 130 using the protocols defined for these high-speed links.

In one embodiment as shown in FIG. 2, PM firmware 230 is located within NVRAM 130. In some embodiments, PM firmware 230 can be located within BIOS NVRAM 160. Alternatively, PM firmware module 230 can be located in any non-volatile memory accessible by processor 110. Registers SLP_EN 211 and SLP_TYPE 212 are shown to be located within chipset 250 (e.g., within I/O subsystem 115). Alternatively, SLP_EN 211 and SLP_TYPE 212 can be located in any hardware component accessible by processor 110 (e.g., within processor 110 or other processor-accessible modules). In an alternative embodiment, computer system 200 can include hardware (e.g., PM hardware 236 or other hardware logic), software (executable by processor 110 or other micro-controllers), firmware (e.g., PM firmware 230 or other firmware logic), or a combination thereof to manage the sleep states of computer system 200.

Having described the platform that implements the power management according to embodiments of the invention, the following is a description of the power management operations that are performed to enhance system sleep states according to embodiments of the invention.

Figure 3:
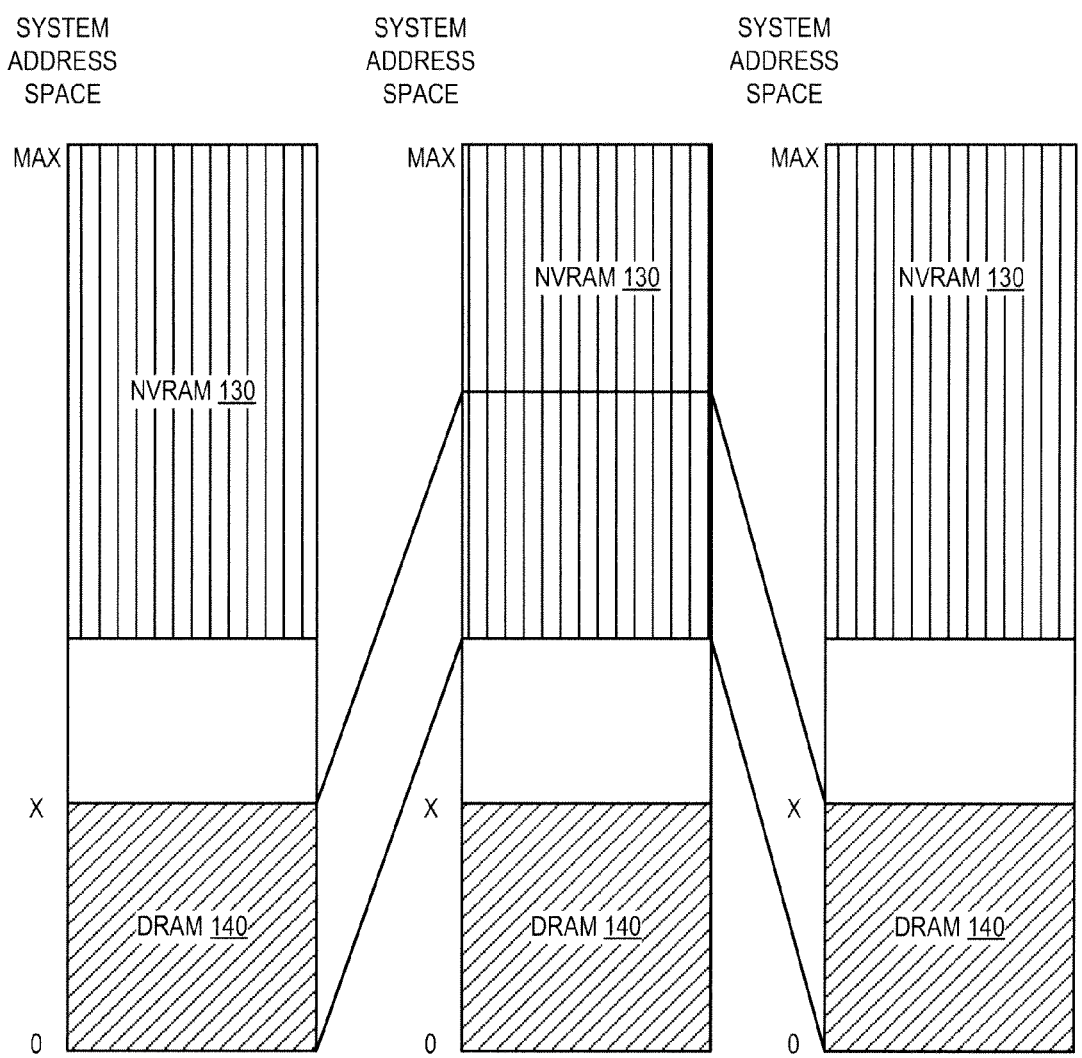
FIG. 3 illustrates an example of address mapping between NVRAM and Dynamic Random Access Memory (DRAM) according to one embodiment of the invention.

FIG. 3 is a block diagram illustrating an example of address space mapping between DRAM 140 and NVRAM 130 according to one embodiment of the invention. In one embodiment, the system address space of computer system 200 of FIG. 2 (or computer system 100 of FIG. 1) spans contiguously from address 0 to address Max. In this example, the system address space 0-X is backed by DRAM 140, and the high-end of the system address space is backed by NVRAM 130. Before computer system 200 transitions into a sleep state that requires memory context to be preserved, PM firmware 230 copies the data in DRAM 140 into the address space of NVRAM 130 (e.g., FM 142 region of FIG. 2 which is configured as the system memory). After computer system 200 transitions out of the sleep state, PM firmware 230 copies the data in NVRAM 130 back into the address space of DRAM 140. As the capacity of NVRAM 130 is generally much greater than that of DRAM 140, NVRAM 130 can easily accommodate all of the contents of DRAM 140 without loss of any data.

The mechanism of copying data from DRAM to NVRAM during sleep state transitions not only saves power but also improves the reliability of the memory contents. Since the DRAM contents are copied into NVRAM 130, DRAM 140 can be turned off during the sleep state. At the same time, patrol scrubs can also be safely turned off without any loss of data. Patrol scrubs are typically performed in the background to verify the correctness of memory contents; e.g., by using error correction codes. In a conventional system with DRAM memory that enters a sleep state such as S1 or S3, patrol scrubs are turned off. If the system is left in the sleeps state for an extended time, it is possible some data could be lost. By copying the DRAM data into NVRAM 130 as described herein, there is no need for patrol scrubs since NVRAM 130 is non-volatile. Therefore, data can be retained in NVRAM 130 for a longer time than it could in DRAM 140.

It should be understood that the use of PM module 210 for managing sleep state transitions is independent of the configuration of memory and storage subsystem 280. More specifically, computer system 200 can perform the power management techniques described herein regardless whether memory and storage subsystem 280 includes more memory devices than what is shown in FIG. 2, and/or includes more or few partitions within NVRAM 130 than what is shown in FIG. 2. In the following description, these alternative embodiments of computer system 200 are collectively referred to as the "variants of computer system 200." FIG. 4A is a flow diagram illustrating a method 400 of managing the transition into a sleep state according to one embodiment of the invention. FIG. 4B is a flow diagram illustrating a method 450 of managing the transition out of a sleep state according to one embodiment of the invention. Methods 400 and 450 can be executed by computer system 100 of FIG. 1, computer system 200 of FIG. 2 or its variants as previously described. For simplicity of the description, the operations of the flow diagrams of FIGS. 4A and 4B will be described with reference to the embodiment of FIG. 2. However, it should be understood that the operations of the flow diagram can be performed by the embodiment of FIG. 2, as well as embodiments other than those shown in these figures. Additionally, the embodiments discussed with reference to FIG. 2 can perform different operations than those discussed with reference to the flow diagram of FIGS. 4A and 4B.

For simplicity of discussion, the operations of methods 400 and 450 are described as being performed by PM firmware 230. However, it is understood that these operations can be performed by hardware (e.g., PM hardware 236 or other hardware logic), software (executable by processor 110 or other micro-controllers), firmware e.g., PM firmware 230 or other firmware logic), or a combination thereof.

In one embodiment, PM firmware 230 intercepts a write operation to SLP_EN register 211 (block 401). The write operation can be initiated by the OS in response to an internally generated event or an externally generated command. The interception of the write operation according to embodiments of the invention temporarily blocks the platform hardware from handling the sleep state transition. Instead, PM firmware 230 takes control of the execution flow to perform the operations described below in blocks 402-405. In some embodiments, "taking control of the execution flow" means that the code (e.g., instructions) programmed into PM firmware 230 is executed by processor 210 or hardware circuitry. When PM firmware 230 takes control of the execution flow, the OS can be unaware of the operations being performed.

When the OS initiates the write operation to SLP_EN register 211, the OS can also write a requested sleep type into SLP_TYPE register 212 to specify a requested sleep type. The requested sleep type specifies a sleep state that requires memory context to be preserved between sleep and wake states. Upon intercepting (i.e., trapping) the write request to SLP_EN register 211, PM firmware 230 copies the contents in DRAM 140 address space to NVRAM 130 (block 402). The power to DRAM 140 is then turned off (block 403). PM firmware 230 maps the system address space to the region of NVRAM 133 that contains the DRAM contents (block 404). PM firmware 230 then issues a command to SLP_EN register 211 to send the request for entry to the sleep state to the platform hardware that is responsible for performing the operations of sleep state transition (block 405). The platform hardware then handles the sleep state transition (e.g., shutting down platform devices and the platform), and computer system 200 enters the requested sleep state (block 406), with no power supplied to the DRAM 140.

Subsequently, referring to FIG. 4B, a wake event occurs. For some sleep states (e.g., S1 and S3), the wake event causes processor 110 to boot the platform hardware and system software. Before the OS takes control of the platform, PM firmware 230 intercepts the wake event (block 421) and schedules a copy-back operation to copy the DRAM contents from NVRAM 130 back to DRAM 140 (block 422). PM firmware 230 then returns control to the OS (block 423). The OS continues to run using the data in NVRAM 130 without the use of DRAM 140, not knowing that part of the system memory space which was mapped to DRAM 140 is now mapped to NVRAM 130. As soon as the copy-back operation of block 422 is completed, a firmware event is triggered (block 424). In an embodiment where hardware (e.g., PM hardware 236) is used to manage the sleep state transitions, a hardware event is triggered instead of a firmware event. In response to the event, PM firmware 230 remaps the system address space (which was mapped to NVRAM 130 in block 404) to DRAM 140 (block 425). Computer system 200 thus returns to a working state, which is state before it enters the sleep state (block 426).

In alternative embodiments, at block 421 where PM firmware 230 intercepts the wake event before the OS takes control of the platform, the PM firmware 230 copies the DRAM contents from NVRAM 130 back to DRAM 140 and then returns control to the OS.

As described above, embodiments of the invention can be beneficial to server computers which have no or limited support for sleep states such as S1 and S3. Embodiments of the invention allow power to the DRAM portion of the system memory to be turned off, regardless which sleep state is being requested. Data in the DRAM is preserved with the use of NVRAM. The data copy operations can be performed transparently to the OS (or the VMM in a virtual machine system).

Embodiments of the invention can also enable server systems to better utilize the S4 sleep state. In conventional server systems, DRAMs can be in the order of terabytes. Copying the DRAM contents to the disk and restoring the contents back to the DRAM memory can take an order of magnitude of multiple seconds. This long latency makes the S4 sleep state practically unusable in the server systems. However, with NVRAM-backed systems as described herein, the DRAM footprint is much smaller than the NVRAM, and the OS can come out of the sleep state without immediately requiring the data from NVRAM to be copied back to the DRAM. Therefore, the latency that is impeding the use of S4 in conventional servers can be significantly reduced.

The techniques shown in the flow diagram of FIGS. 4A and 4B can be implemented using instructions and data stored on non-transitory machine-readable or computer-readable media, such as non-transitory machine-readable or computer-readable storage media (e.g., magnetic disks; optical disks; random access memory; read-only memory; flash memory devices; and phase-change memory).

Embodiments of the invention may also be provided as a computer program product which may include a non-transitory machine-readable medium having stored thereon instructions which may be used to program a computer (or other electronic device) to perform a process. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
   intercepting, by power management firmware in a computer system, a request initiated by an operating system of the computer system for entry into a sleep state, the operating system entering a sleep-state in response thereto, the computer system comprising a processor coupled to a dynamic random access memory (DRAM) and a non-volatile system memory, the non-volatile system memory being byte addressable by the processor, the non-volatile system memory not acting as block addressable mass storage, the non-volatile system memory being accessible at cache line granularity by the processor, the operating system operating out of the non-volatile system memory, wherein the DRAM provides a portion of system memory address space for the computer system;
   copying data from the DRAM to the non-volatile system memory, mapping the portion of the system memory address space from the DRAM to the non-volatile system memory, and turning off a power supply to the DRAM when the computer system transitions into the sleep state; and
   upon occurrence of a wake event, waking the operating system for the computer system to resume working state operations that operate out of the non-volatile system memory without the operating system knowing that the portion of the system memory address space has been mapped to the non-volatile system memory.

2. The method of claim 1, further comprising:
   intercepting, by the power management firmware, the wake event upon its occurrence;
   scheduling, by the power management firmware, a copy-back operation prior to returning control to the operating system; and
   performing the copy-back operation to copy the data from the non-volatile system memory back to the DRAM in a background process after the control is returned to the operating system.

3. The method of claim 2, further comprising:
upon completion of the copy-back operation, receiving by the power management firmware a firmware event; and
remapping the portion of the system memory address from the non-volatile system memory back to the DRAM.

4. The method of claim 1, further comprising:
intercepting, by the power management firmware, the wake event upon the occurrence of a wake event; and
copying the data from the non-volatile system memory back to the DRAM prior to returning control to the operating system.

5. The method of claim 1, further comprising:
prior to the entry to the sleep state, issuing by the power management firmware a command to a sleep enable register to send the request for entry to the sleep state to hardware of the computer system that performs operations of sleep state transition.

6. The method of claim 1, wherein the non-volatile system memory provides another portion of the system memory address space.

7. The method of claim 1, wherein the non-volatile system memory comprises the power management firmware.

8. An apparatus comprising:
a processor, the processor coupled to an interface to couple to a non-volatile system memory, the non-volatile system memory being byte addressable by the interface, the non-volatile system memory not acting as block addressable mass storage, the non-volatile system memory being accessible at cache line granularity by the interface, the processor to execute an operating system, the operating system to operate out of the non-volatile system memory; and
a power management module coupled to the processor, the non-volatile system memory and a dynamic random access memory (DRAM), wherein the DRAM is to provide a portion of system memory address space for a computer system, the power management module to intercept a request initiated by the operating system of the computer system for entry into a sleep state, copy data from the DRAM to the non-volatile system memory, map the portion of the system memory address space from the DRAM to the non-volatile system memory, and turn off the DRAM when the computer system transitions into the sleep state, and upon occurrence of a wake event and the wake up of the operating system the computer system resumes working state operations that operate out of the non-volatile system memory without the operating system knowing that the portion of the system memory address space has been mapped to the non-volatile system memory.

9. The apparatus of claim 8, wherein the power management module is to:
intercept the wake event upon the occurrence of a wake event;
schedule a copy-back operation prior to returning control to the operating system; and
perform the copy-back operation to copy the data from the non-volatile system memory back to the DRAM in a background process after the control is returned to the operating system.

10. The apparatus of claim 9, wherein the power management module is to:
upon completion of the copy-back operation, receive an event and
remap the portion of the system memory address from the non-volatile system memory back to the DRAM.

11. The apparatus of claim 8, wherein the power management module is to:
intercept the wake event upon the occurrence of a wake event; and
copy the data from the non-volatile system memory back to the DRAM prior to returning control to the operating system.

12. The apparatus of claim 8, wherein:
the power management module is to, prior to the entry to the sleep state, issue a command to a sleep enable register to send the request for entry to the sleep state to hardware of the computer system that performs operations of sleep state transition.

13. The apparatus of claim 8, wherein the non-volatile system memory is to provide another portion of the system memory address space.

14. The apparatus of claim 8, wherein the power management module comprises power management firmware located in the non-volatile system memory.

15. The apparatus of claim 8, wherein the power management module comprises one or more of the following: software, firmware, and hardware.

16. The apparatus of claim 8, further comprising a mechanism to trap a software request to enter the sleep state and defer the software request until the DRAM to the non-volatile system memory copy is completed, wherein the mechanism comprises firmware, hardware or a combination of the two.

17. A system comprising:
a processor in a computer system;
a non-volatile system memory coupled to the processor, the non-volatile system memory being byte addressable by the processor, the non-volatile system memory not acting as block addressable mass storage, the non-volatile system memory being accessible by the processor at cache line granularity, an operating system of the computer system to operate out of the non-volatile system memory;
a dynamic random access memory (DRAM) that provides a portion of system memory address space for the computer system; and
a power management module coupled to the processor, the non-volatile system memory and the DRAM, the power management module to intercept a request initiated by the operating system of the computer system for entry into a sleep state, copy data from the DRAM to the non-volatile system memory, map the portion of the system address space from the DRAM to the non-volatile system memory, and turn off the DRAM when the computer system transitions into the sleep state, and upon occurrence of a wake event and the wake up of the operating system, the computer system resumes working state operations that operate out of the non-volatile system memory without the operating system knowing that the portion of the system address space has been mapped to the non-volatile system memory.

18. The system of claim 17, wherein the power management module is to:
intercept the wake event upon the occurrence of a wake event;
schedule a copy-back operation prior to returning control to the operating system; and
perform the copy-back operation to copy the data from the non-volatile system memory back to the DRAM in a background process after the control is returned to the operating system.

19. The system of claim 18, wherein the power management module is to:
   upon completion of the copy-back operation, receive an event; and
   remap the portion of the system memory address from the non-volatile system memory back to the DRAM.

20. The system of claim 17, wherein the power management module is to:
   intercept the wake event upon the occurrence of a wake event; and
   copy the data from the non-volatile system memory back to the DRAM prior to returning control to the operating system.

21. The system of claim 17, wherein:
   the power management module, prior to the entry to the sleep state, is to issue a command to a sleep enable register to send the request for entry to the sleep state to hardware of the computer system that performs operations of sleep state transition.

22. The system of claim 17, wherein the power management module comprises one or more of the following: software, firmware, and hardware.

23. An apparatus, comprising:
   a power management module to communicate with a processor in a computer system having a non-volatile system memory and a dynamic random access memory (DRAM), an operating system of the computer system to operate out of the non-volatile system memory, the non-volatile system memory not acting as block addressable mass storage, the non-volatile system memory being accessible by the processor at cache line granularity, wherein the DRAM provides a portion of system memory address space for the computer system, the power management module to intercept a request initiated by the operating system of the computer system for entry into a sleep state, copy data from the DRAM to the non-volatile system memory, map the portion of the system memory address space from the DRAM to the non-volatile system memory, and turn off the DRAM when the computer system transitions into the sleep state, and upon occurrence of a wake event and the wake up of the operating system, the computer system resumes working state operations that operate out of the non-volatile system memory without the operating system knowing that the portion of the system memory address space has been mapped to the non-volatile system memory.

24. The apparatus of claim 23 wherein, wherein the power management module is to:
   intercept the wake event upon the occurrence of a wake event;
   schedule a copy-back operation prior to returning control to the operating system; and
   perform the copy-back operation to copy the data from the non-volatile system memory back to the DRAM in a background process after the control is returned to the operating system.

25. The apparatus of claim 24, wherein the power management module is to:
   upon completion of the copy-back operation, receive an event; and
   remap the portion of the system memory address space from the non-volatile system memory back to the DRAM.

26. The apparatus of claim 23, wherein the power management module is to:
   intercept the wake event upon the occurrence of a wake event; and
   copy the data from the non-volatile system memory back to the DRAM prior to returning control to the operating system.

27. The apparatus of claim 23, wherein:
   the power management module is to, prior to the entry to the sleep state, issue a command to a sleep enable register to send the request for entry to the sleep state to hardware of the computer system that performs operations of sleep state transition.

28. The apparatus of claim 23, wherein the power management module comprises one or more of the following: software, firmware, and hardware.

* * * * *